Feb. 19, 1957 H. BELAR 2,782,266
VOLUME CONTROL
Filed Aug. 30, 1954
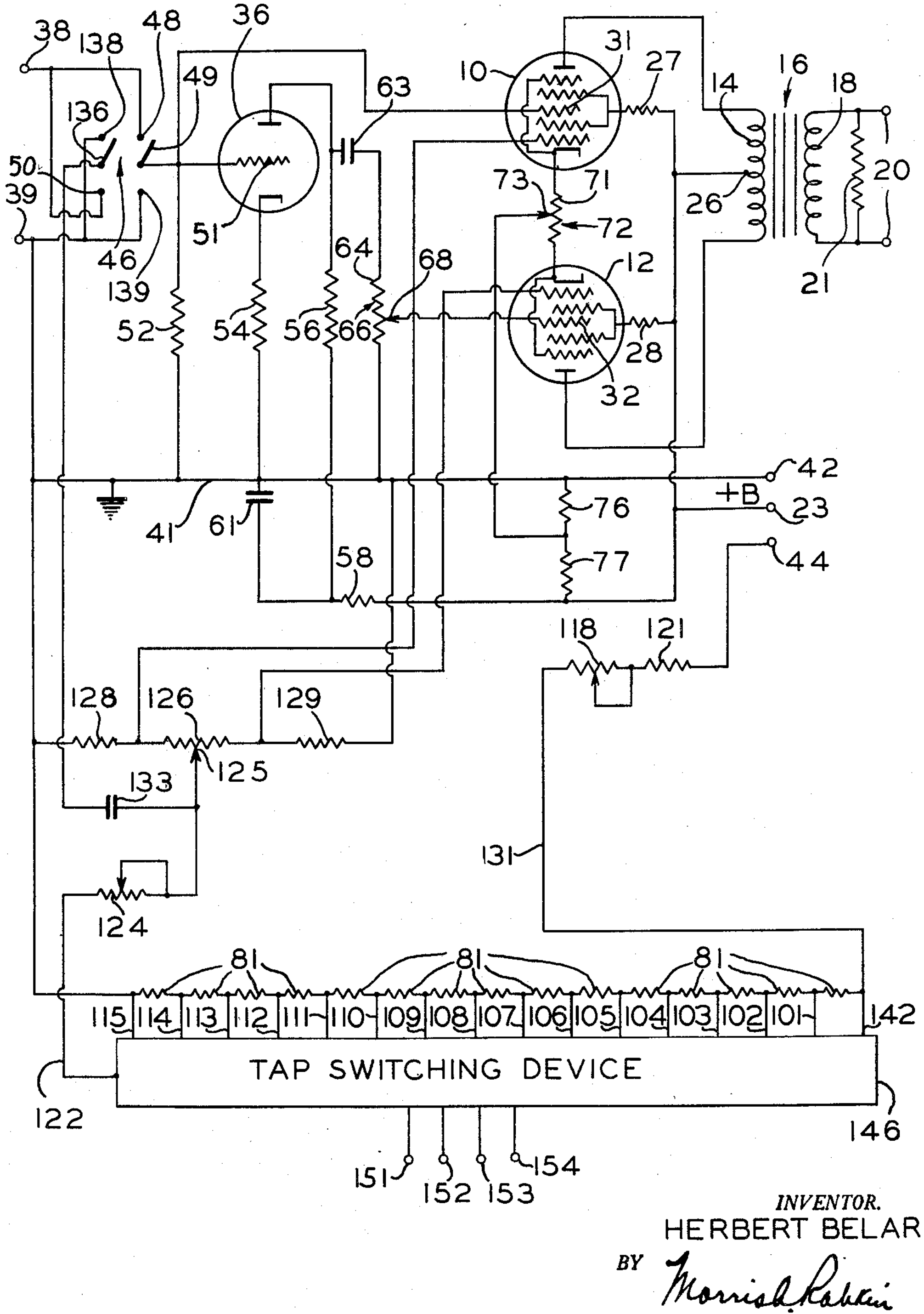
INVENTOR.
HERBERT BELAR
BY Morris A. Rabkin
ATTORNEY United States Patent Office 2,782,266
Patented Feb. 19, 1957

2,782,266

VOLUME CONTROL

Herbert Belar, Palmyra, N. J., assignor to Radio Corporation of America, a corporation of Delaware Application August 30, 1954, Serial No. 452,865

The terminal fifteen years of the term of the patent to be granted has been disclaimed 3 Claims. (Cl. 179—171)

The present invention relates to volume control arrangements, and, more particularly, but not necessarily exclusively, to a novel volume control arrangement for an amplifier which provides for a smooth change in gain of the amplifier by substantially eliminating disturbing noises arising from rapid changes in amplifier bias.

In accordance with the present invention a volume control arrangement is provided for a balanced stage of an amplifier by which the bias for the input electrodes of the amplifier tubes is effectively balanced. The gain of the amplifier so equipped may be rapidly changed without producing disturbing sounds in the amplifier output. When audio signals are transmitted by an amplifier not equipped in accordance with the teachings of this invention the disturbing sound is in the nature of a "thump." As is well known, when two exponential tubes are used in a push-pull circuit it is usually possible to balance the plate current at one point. This may be done with a cathode balancing potentiometer. If balance is set by the cathode balancing potentiometer for maximum tube current, which is also maximum gain, the greatest amount of unbalancing current can be eliminated but this is not enough to reduce the "thump" due to rapid changes in bias. This is so because all tubes do not have the same slope of the current vs. bias characteristic. In accordance with the present invention thump is eliminated by also adjusting the bias to the input electrodes of the tubes preferably at the lowest value of gain.

An object of the present invention is to provide a novel volume control arrangement for the balanced stage of an amplifier.

Another object is to provide for the elimination of "thump" in the balanced stage of an amplifier which usually occurs upon effecting rapid changes in amplifier bias.

A further object is to provide a novel biasing arrangement for the input electrodes of the tubes in a balanced stage of an amplifier which is easy to adjust.

Other objects and advantages of the present invention will, of course, become apparent and immediately suggest themselves to those skilled in the art to which the invention is directed from a reading of the following specification in connection with the accompanying drawing which shows, diagrammatically, an amplifier embodying the present invention.

Referring to the single figure of the drawing there is shown an amplifier comprising a pair of amplifier tubes 10 and 12. Type 6BE6 tubes, for example, may be used. The anodes of the tubes are connected to the ends of the tapped primary 14 of the transformer 16. The secondary 18 of the transformer connects to output terminals 20 and may be bridged by a resistor 21. A power supply of the usual type (not shown) has its positive terminal connected to the positive power supply connection terminal indicated at 23. Plate current is thus supplied to the tubes 10 and 12 by way of the center tap connection 26 on the transformer primary 14. The No. 2 and No. 4 grids of each tube are internally connected to serve as a screen. These grids of tube 10 are connected by way of a resistor 27 to the terminal 23 and the corresponding grids are connected by way of a resistor 28 to the same terminal. The No. 3 grid 31 of the tube 10 serves as a signal input grid as does the number 3 grid 32 of the tube 12. The input signal to the grid 32 is applied from a phase inverter tube 36.

A pair of input terminals are designated 38 and 39. The terminal 39 is connected to a common circuit connection, such as ground, in the amplifier circuit. This common circuit connection in the illustrative example is conveniently represented by a conductor 41 which communicates with a terminal 42. It will be understood that the previously mentioned power supply may have its negative terminal connected to the terminal 42 in the usual manner. The biasing circuit, to be described hereinafter, is provided with a terminal 44 to which the negative terminal of a power supply (not shown) is connected. It will be understood that any type of power supply may be employed, for example one having a bleeder resistor in which a tap from the bleeder is connected to the terminal 42. The terminals 23, 42 and 44 may be embodied for convenience in a plug connecter.

A double-pole, double-throw switch 46, which may be of the rotary wafer type, has fixed contacts 48 and 50 thereof connected to the input terminal 38. One movable contact 49 of the switch is connected to the grid 51 of the tube 36 and to the grid 31 of the tube 10. The grid 51 is connected to the common circuit connection through a resistor 52 and the cathode of the tube 36 is connected to the common circuit connection through a cathode resistor 54. The anode of the tube 36 is connected through a load resistor 56 to the +B terminal 23 by way of a dropping resistor 58. A decoupling capacitor 61 of relatively high value is connected between the resistor 58 and the common circuit connection. A coupling capacitor 63 is connected from the anode of the tube 36 to the resistor 64 of a potentiometer 66. The remaining end of the resistor 64 is connected to the common circuit connection. The movable contact 68 of the potentiometer is connected to the grid 32 of the tube 12.

The cathodes of the tubes 10 and 12 are connected respectively to the ends of the resistor 71 of a potentiometer 72. The movable contact 73 of the potentiometer 72 is connected between resistors 76 and 77 so as to provide a positive bias for the cathodes of the tubes 10 and 12.

The above described circuit arrangements, with the exception of the switch 46, are somewhat conventional and circuit components having values which are more or less usual are employed. For example, the impedance ratio of the transformer 16 is in the neighborhood of 30,000 to 500. The input resistor 52 is or may be 470,000 ohms. The positive voltage applied at the terminal 23 is in the neighborhood of 300 volts and the positive voltage appearing between the resistors 76 and 77 is in the neighborhood of 2.65 volts. The value given for the resistor 52 is suitable when a 6C4 tube is used.

The volume control, which is provided for the balanced stage of the amplifier comprising tubes 10 and 12, is made up of 15 resistors which may have a value of, for example, 3,900 ohms each. These resistors are all designated by reference character 81 since they are similar. The junction points of these resistors and one end of the series combination provide 15 steps of volume control and are labelled 101 to 115. One end of the series combinations of resistors 81 is connected by way of a rheostat or adjustable resistor 118 and a series resistor 121 to the previously mentioned terminal 44. The negative terminal of a power supply is, as stated above, connected to the terminal 44. In the illustrative arrangement the voltage at the terminal 44 is, for example, 105 volts negative with respect to the common circuit connection. In the illustrative example, the adjustable resistor 118 has a value of 100,000 ohms and the resistor 121 has a value of 82,000 ohms.

A conductor 122 is connected to a rheostat or adjustable resistor 124. The other end of the latter is connected to the sliding contact 125 of a potentiometer 126. Resistors 128 and 129 are connected to the respective ends of the potentiometer 126 and to the common lead 41. In the illustrative example, the resistor 126 has a value of 2 megohms and the resistors 128 and 129 each have a value of 2.4 megohms. The adjustable resistor 124 has a value of 500,000 ohms. Approximately 40 volts, negative, is available at the conductor 131. The sliding contact 125 is connected by way of a capacitor 133 to the second movable contact 136 of the switch 46. Fixed contacts 138 and 139 are connected to the common conductor 41.

The previously mentioned taps or leads 101 to 115, along with another lead 142, serve as taps on the potentiometer provided by the resistors 81 in series. The conductor 122 serves as the connection to taps or leads 101 to 115 and 142 in a manner to be explained. It will be understood that the resistors 81 may be replaced by a single potentiometer resistor and that the lead 122 may be connected to a slider on this single potentiometer resistor.

Reference character 146 indicates, schematically, a tap switching system or device of any known kind which can selectively connect the lead 122 to any one of the leads 101 to 115 or 142 in response to control signals applied in coded form, if desired, to the conductors 151 to 154. The switching system may be a "relay tree." A similar relay tree is described in Electrical Engineering, page 958, volume 68, 1949. It will be understood that various relay arrangements other than the one referred to may be employed. Also, instead of mechanical relays, vacuum tube relays may be employed. Also, any known source of coded signals may provide selector control signals to the leads 151 to 154. The arrangement 146 is not a separate part of the present invention and, as stated above, the lead 122 may be connected to a simple slider (not shown) or it may be connected to a movable switch contact (not shown) successively engaging contacts connected to the leads 101 to 115 and 142.

Operation and adjustment of the volume control of this invention will now be described. With the tubes, component values, and voltages given solely by way of example, the gain change is approximately 2 db per step as provided by the resistors 81. To adjust the amplifier the rheostat 124 is set to a desired value. This rheostat in conjunction with the capacitor 133 provides a time constant circuit. This time constant is the usual product of resistance and capacitance. Because of the time constant the change in gain of the amplifier is gradual when changing from one volume control step or tap to the other. The time constant may be adjusted by changing the value of the resistor 124. The rheostat 118 can then be set to give 30 db attenuation at minimum gain. The latter is attained by connecting the lead 122 to the lead 142 for maximum external bias. It is to be noted that the gain of the amplifier with zero external bias is unity, or zero db.

With the initial setting just described and with the potentiometer 66 set in the usual manner for signal balance, balance can be determined by measuring the voltage at the grid 31 and the grid 32. In the next balancing step the potentiometer 72 is adjusted with zero input to the amplifier so that zero current appears across the anodes of the tubes 10 and 12.

The gain control is set to the —30 db position which is achieved by connection of the lead 122 to the lead 142. The switch 46 is set to its lowermost or "balance" position and an external signal is applied to the terminals 38 and 39 having an input value of 1 volt. The potentiometer slider 125 is then adjusted for minimum audio output indicating balance applied to the No. 1 grids of the tubes 10 and 12. The external signal in this instance is being applied push-push.

What is claimed is:

1. An amplifier comprising a phase inverter tube, said tube having a cathode, an anode and a control electrode, a switch having first and second movable contacts, a connection from said first contact to said control electrode, amplifier input terminals, first and second fixed contacts engageable by said first movable contact, connections from said input terminals to said fixed contacts, a pair of amplifier tubes, said tubes each having at least two electrodes to serve as control electrodes, means connecting one of said control electrodes in each tube in push-pull arrangement, said means including said phase inverter tube, biasing means for the other of said control electrodes in said tubes, said biasing means comprising three resistors connected in series relationship, the ends of said series combination being connected to a common circuit connection in said amplifier circuit, one of said resistors serving as a potentiometer and having a sliding potentiometer contact, means connecting the others of said control electrodes to the ends of said potentiometer resistor, a second potentiometer resistor connected at one end to said common circuit connection, adjustable means for applying a voltage negative with respect to said common circuit point to said second potentiometer resistor, means for connecting said sliding contact selectively to points on said second potentiometer resistor, a capacitor connected between said sliding contact and said second movable switch contact, first and second fixed contacts being engageable by said second movable switch contact, a connection from said last named first fixed contact to said common circuit point, and a connection from said last named second fixed contact to one of said input terminals.

2. An amplifier comprising a phase inverter tube, said tube having a cathode, an anode and a control electrode, a switch having first and second movable contacts, a connection from said first contact to said control electrode, amplifier input terminals, first and second fixed contacts engageable by said first movable contact, connections from said input terminals to said fixed contacts, a pair of amplifier tubes, said tubes each having at least two electrodes to serve as control electrodes, means connecting one of said control electrodes in each tube in push-pull arrangement, said means including said phase inverter tube, biasing means for the other of said control electrodes in said tubes, said biasing means comprising three resistors connected in series relationship, the ends of said series combination being connected to a common circuit connection in said amplifier circuit, one of said resistors serving as a potentiometer and having a sliding potentiometer contact, means connecting the others of said control electrodes to the ends of said potentiometer resistor, a second potentiometer resistor connected at one end to said common circuit connection, means for applying a voltage negative with respect to said common circuit point to said second potentiometer resistor, signal responsive means for connecting said sliding contact selectively to points on said second potentiometer resistor, a capacitor connected between said sliding contact and said second movable switch contact, first and second fixed contacts being engageable by said second movable switch contact, a connection from said last named first fixed contact to said common circuit point, and a connection from said last named second fixed contact to one of said input terminals.

3. An amplifier comprising a phase inverter tube, said tube having a cathode, an anode and a control electrode, a switch having first and second movable contacts, a connection from said first contact to said control electrode, amplifier input terminals, first and second fixed contacts engageable by said first movable contact, connections from said input terminals to said fixed contacts, a pair of amplifier tubes, said tubes each having at least two electrodes to serve as control electrodes, means connecting one of said control electrodes in each tube in push-pull arrangement, said means including said phase inverter tube, biasing means for the other of said control electrodes in said tubes, said biasing means comprising three resistors connected in series relationship, the ends of said series combination being connected to a common circuit connection in said amplifier circuit, one of said resistors serving as a potentiometer and having a sliding potentiometer contact, means connecting the others of said control electrodes to the ends of said potentiometer resistor, a second potentiometer resistor connected at one end to said common circuit connection, adjustable means for applying a voltage negative with respect to said common circuit point to said second potentiometer resistor, means for connecting said sliding contact selectively to points on said second potentiometer resistor, first and second fixed contacts being engageable by said second movable switch contact, a connection from said last named first fixed contact to said common circuit point, and a connection from said last named second fixed contact to one of said input terminals.

References Cited in the file of this patent

UNITED STATES PATENTS

| | | |
|---|---|---|
| 2,485,538 | Rowe | Oct. 18, 1949 |
| 2,616,988 | Rodenhuis | Nov. 4, 1952 |
| 2,619,613 | Sanger | Nov. 25, 1952 |
| 2,666,179 | Maxwell | Jan. 12, 1954 |